Patented Aug. 18, 1931

1,820,000

UNITED STATES PATENT OFFICE

CAESAR GUSTAV LUIS, OF LONDON, ENGLAND

EXPLOSIVE

No Drawing. Application filed February 15, 1928, Serial No. 254,600, and in Great Britain March 9, 1927.

This invention relates to explosives of that class in which the principal ingredients are organic matter and a perchlorate oxygen carrier and it also relates to a method or procedure which may be adopted when making up explosive compositions as set out hereunder.

Amongst other compositions falling within this class it has been proposed to use as the organic substance one containing tannin. In particular the use of myrobalans or, alternatively, divi-divi or valonia have been named though myrobalans was indicated preferably as containing a considerable quantity of ellagotannic acid.

There are several different kinds or qualities of the fruit or substance broadly termed commercially as myrobalans and it has been found now that while it is possible to form explosive compositions, though of a varying and more or less inferior quality, with different kinds of the substance broadly designated myrobalans, on the other hand a powerful explosive composition can be made up if there is used one particular quality or grade of myrobalans as obtained from a particular growth of the tree bearing this fruit. The particular grade or quality of myrobalans is now selected for use by reason of its containing a substantial proportion of chebulinic acid which is present in a lesser degree in the other grades of commercial myrobalans which are in consequence rendered unsuitable for the obtainment of satisfactory results.

According to this invention an explosive composition is formed of a perchlorate oxygen carrier, namely either perchlorate of ammonium or perchlorate of sodium alone or a mixture of perchlorate of ammonium with perchlorate of sodium or potassium, each in a state reasonably free from impurities such as chlorates, and the dried and powdered husk or flesh, that is the outer part only and excluding the stone or kernel, of the fruit of Terminalia chebula. This is one of the fruits often referred to by the general name "myrobalans" but the fruit of Terminalia chebula which is here used is to be distinguished from the beleric and tomentosa varities which are not suitable to the present purpose. The Teminalia chebula is grown in British India. This dried and powdered husk or flesh of Teminalia chebula contains a substantial proportion of chebulinic acid. For the purpose of this invention it is necessary that the stones or kernels should be excluded and moreover that these should have been removed before drying of the husk as otherwise valuable properties, and in particular the chebulinic acid present in the flesh or husk, tend to be taken therefrom and absorbed by the kernel. The stones or kernels are inert and therefore useless for the purpose of this invention and hence the necessity for excluding these, only the dried and powdered husk being usable in order to obtain the desired effect. The powder formed by mixing the perchlorate and the powdered husk has a yellow appearance derived from the powdered husk. The perchlorate is employed in a proportion ranging from 36% to 86% and the powdered husk is used in a proportion ranging from 9% to 36%. In some cases it is desirable to cause the particles of this powder to adhere together to form grains as is done with black powder, or it is desirable to be able to make up the powder into cartridges having a certain plasticity. With this object there may be added to the mixture of perchlorate and powdered husk a small quantity of gelatine of agar-agar sufficient to cause the particles of powder to adhere and enable them to be formed into grains as for instance by passing the powder treated with the gelatine of agar-agar through a sieve of the desired mesh. Alternatively, a vegetable oil, namely, castor oil or colza or rape oil may be used in such small quantity as will serve to cause the particles of powder to adhere and enable them to be made up into cartridges of a plastic nature. In some cases from 25% to 35% of nitrate of sodium may be used in substitution for a part of the perchlorate oxygen carrier.

Where castor oil or colza or rape oil is used for the purpose of making the particles of powder adhere so as to obtain plasticity, the oil, which replaces part of the myrobalans husk powder, tends to weaken the powder of the explosive composition but its weakening effect may be counteracted to some extent by using a small quantity of a resinous gum such as red gum. For example, from 2% to 7% of oil may be used and with it from 2% to 7% of red gum. Yet further and with the object of obtaining plasticity, there may be combined with the mixture of perchlorate and powdered husk from 2% to 7% of castor oil with 2% to 7% of glycerine either with or without from 2% to 7% of red gum.

In the dried condition as normally available commercially, the husk or flesh of Terminalia chebula, excluding the stone or kernel, contains from 3% to about 5% of moisture.

In making up an explosive composition according to this invention the husk or flesh of Terminalia chebula, as above indicated and without further drying, is ground to a fineness sufficient for the powder to pass through a sieve of approximately 60 mesh. This powder is placed in a mixing machine of suitable known type and there is then added thereto gradually the desired quantity of the perchlorate oxygen carrier for example perchlorate of ammonia. This perchlorate is powdered to a fineness such as to enable it to pass through a sieve of substantially 100 mesh. The perchlorate is thus added gradually to the powdered husk so that there will be such an even blending and intimate mixture of the two powders that the particles of perchlorate may be said to be absorbed into or in effect combined with the particles of husk. It is necessary that the mixing of the perchlorate with the powdered husk should be thus carried out in order that as far as practicable the particles of husk may be combined with the particles of perchlorate in substantially those proportions in which these substances respectively are used in the composition. If this proportionate combining of the particles of the two substances is not effected, at any rate throughout the greater part of the composition, uneven burning will result and the explosive will not be satisfactory. If after the mixing of the powders has been carried out correctly the mingled powders are examined under a microscope it should not be practicable to distinguish to any appreciable extent the white particles of the perchlorate but all the particles should be tinged with or have acquired a yellow colour from the powdered husk.

If after mixing of the powdered husk and perchlorate the composition is to be treated with gelatine of agar-agar, this gelatine is broken up into lumps of convenient small size, as for example approximately the size of hazel nuts or smaller, and these lumps of gelatine are added to the powdered mixture in the mixing machine the whole composition being then stirred or mixed until the gelatine has adhered to the particles of powder. The composition is then passed through one or more sieves, so as to result in the formation of small grains of the required size, which for example may be such as will pass through a sieve of 18 mesh.

If the composition is to contain sodium nitrate in addition to the powdered husk as described and a perchlorate oxygen carrier, the perchlorate is first added to the powdered husk in the manner indicated above and then the sodium nitrate, powdered so as to pass through a sieve of substantially 80 mesh, is added in substantially the same gradual manner. If this composition is to be treated with agar-agar, the procedure above indicated is followed.

If either of the mixtures such as referred to are to be treated with castor oil, the following alternative methods may be adopted. At the outset the powdered husk may be added to the required quantity of oil and stirred until a paste is formed. This paste is then placed in the mixing machine and the perchlorate is then added gradually as already described. If sodium nitrate is to be used also, this is then added in the same gradual manner as the perchlorate. Alternatively, the perchlorate is added to the powdered husk and subsequently if required sodium nitrate is added also, all in the manner above described. The oil is then allowed to drop gradually on to the mixed powders stirring being continued so that a paste is formed.

While the composition may vary within the proportion ranges indicated above with respect to the several ingredients used, the following may be instanced as examples of the improved explosive compositions which have been found to give satisfactory results, the percentage proportions given indicating parts by weight:—

Husk or flesh only of Terminalia chebula 36%, ammonium perchlorate 64%, with the addition for the purpose indicated above of 7.5% of an aqueous gelatine containing from 1% to 5% of agar-agar. This gelatine is formed by dissolving say one part of agar-agar in 100 parts of water. 7.5% of the gelatine thus formed is then employed to treat the powdered mixture of perchlorate and husk.

Husk or flesh only of Terminalia chebula 33%, ammonium perchlorate 64%, and 2% to 7% (for example 3%) of castor oil.

As an alternative to the above, the following composition may be used:—

Husk or flesh only of Terminalia chebula 22%, ammonium perchlorate 74%, castor oil 4%.

Yet again, the proportion of powdered husk may be further reduced with a corresponding increase in the ammonium perchlorate, as follows:—

Husk or flesh only of Terminalia chebula

9%, ammonium perchlorate 86%, castor oil 5%.

If nitrate of sodium is used in substitution for a part of the perchlorate, the composition may be for example as follows:—

Husk or flesh only of Terminalia chebula 36%, ammonium perchlorate 36%, nitrate of sodium 28%.

Alternatively if perchlorate of sodium is used in place of ammonium perchlorate, the composition may be as follows:—

Husk or flesh only of Terminalia chebula 36%, perchlorate of sodium 38%, nitrate of sodium 26%.

The powder formed by either of these mixtures is treated with 7.5% of an aqueous gelatine containing 1% to 5%, for example 1%, of agar-agar.

The explosive compositions more particularly indicated above can be fired by fuse. Alternative compositions not so well adapted to be fired by fuse but which may be fired by detonator, may be made up in which is used a mixture of ammonium perchlorate and either perchlorate of potassium or perchlorate of sodium. As examples of such compositions the following may be instanced:—

Husk or flesh only of Terminalia chebula 36%, perchlorate of ammonium 31%, perchlorate of sodium 33%.

In such a mixture the quantity of perchlorate of ammonium may range from 27% to 36% while the perchlorate of sodium may range from 37% to 28%.

Again, if perchlorate of potassium is used, the composition may be as follows:—

Husk or flesh only of Terminalia chebula 36%, perchlorate of ammonium 36%, perchlorate of potassium 28%.

These compositions may be used either with or without the addition of gelatine of agar-agar or a small quantity of castor oil.

Instances of other compositions that may be employed are as follows:—

Husk or flesh only of Terminalia chebula 29%, perchlorate of ammonium 64%, castor oil 3%, red gum 4%.

Husk or flesh only of Terminalia chebula 29%, perchlorate of ammonium 36%, nitrate of sodium 28%, castor oil 3%, red gum 4%.

Husk or flesh only of Terminalia chebula 22%, perchlorate of ammonium 64%, castor oil 2%, glycerine 5%, red gum 7%.

Husk or flesh only of Terminalia chebula 28%, perchlorate of ammonium 64%, castor oil 1.5%, glycerine 1.5%, red gum 5%.

The following may be instanced as examples of the manner of making up certain of the particular compositions of which details are given above.

Taking for example a composition made up of powdered husk, ammonium perchlorate and gelatine of agar-agar in the following proportions: Powdered husk 36%, ammonium perchlorate 64%. An aqueous gelatine is formed containing say from 1% to 5% of agar-agar, say for example 1%, and of this equeous gelatine 7.5% is employed and mixed with the mingled powdered husk and perchlorate.

Assuming that it is desired to make up a parcel of approximately 150 pounds by weight of the composition. The husk or flesh only, excluding the stone or kernel, is in the state of dryness in which it is obtainable commercially and is not subjected to any further drying so that it still contains a small percentage of moisture. The husk is ground to a powder of such a fineness as will pass through a sieve of 60 mesh. In order to form the desired quantity of explosive 54 pounds by weight of the powdered husk is placed in a mixer of suitable type. The ammonium perchlorate is ground or reduced to such a fineness as will allow it to pass through a sieve of 100 mesh.

96 pounds by weight of this ammonium perchlorate powder is taken and added gradually to the powdered husk while the mixer is in operation. A convenient arrangement is to dispose a sieve of 100 mesh above the container of the mixer and pass the perchlorate powder through this sieve so that it will fall thence direct into the mixer. With these quantities of powders the adding of the perchlorate should be carried out in such a gradual manner that it will take about twenty minutes before the whole of the perchlorate has passed into the mixer. This procedure ensures an intimate and even association of the particles of ammonium perchlorate with the particles of powdered husk and as a result after the mixing has been completed if the particles are examined under a microscope it should not be possible to distinguish the white of the ammonium perchlorate from the yellow or general yellowish tint of the husk.

It is to be noted that the intimate mingling and close association of the particles of powdered husk with the particles of the perchlorate oxygen carrier reduces materially the risk of danger which exists normally in the handling of perchlorate of ammonium or perchlorate of sodium. Consequently in the case of compositions in which nitrate of sodium is substituted for a part of the perchlorate oxygen carrier it becomes possible when making up such compositions to carry out the addition of the nitrate of sodium with reasonable safety since this substance is added after the perchlorate and the powdered husk have been brought together and mixed.

It is to be noted that if the above process is reversed as by adding the powdered husk to the ammonium perchlorate, an uneven mixing will result and the explosive composition will not fire evenly and satisfactorily. Similarly, if the ammonium perchlorate is not added sufficiently gradually to the powdered husk, an uneven mixing or blending of the two substances will tend to result though such uneven mixing is then less liable to take place than if the husk is added to the ammonium perchlorate.

The necessary proportion of say the 1% gelatine of agar-agar is now taken and this gelatine is broken up into lumps of conveniently small size approximating to the size of hazel nuts or even smaller, as may be convenient. This gelatine is then added to the mingled powders in the mixer and stirring of the parts is continued for a short time, which need not and preferably should not exceed say about ten minutes for the quantity referred to. The particles of powder will now be found to be combined with the gelatine in such a way that it is possible to pass the composition through a sieve having a size mesh in accordance with the required size of grains into which it is desired to form the powder. In some cases the composition when it is taken from the mixer may be passed in succession through sieves of different mesh so as to gradually decrease the fineness of the grains into which the composition is divided. The composition in grains as they emerge from the mesh is then subjected to a moderate drying at a temperature, for example, of 30° centigrade, this drying serving to drive off some or all of the moisture contained in the gelatine of agar-agar. The grains will then have a hard and sharp formation.

It is to be understood that the same procedure is to be followed in the case of a composition such as named above and containing powdered husk, perchlorate of ammonia and perchlorate of sodium. If red gum is employed together with castor oil, the red gum in powdered form is mixed with the castor oil thus forming a paste and this paste is then added to the mixture of powdered husk and perchlorate, the whole being well stirred. If glycerine is used in addition to castor oil and red gum, these three substances are mixed together into a paste and the latter added to the powders and stirred together.

By following the above named procedure in the manufacture of compositions as set out above, it is possible to make explosive compositions which are non-freezing, that is to say, will retain their properties at low temperature. Further, certain of these compositions are capable of being fired by fuse only.

Where the mixture of powdered substances has been treated with gelatine of agar-agar, the strength of this gelatine is determined in accordance with the size of the grains into which the composition is to be made up. The grains are formed conveniently in a known manner by passing through a sieve or the like of the required size mesh the powder after treatment with the gelatine of agar-agar. Thus for example if one of the compositions set out above composed for instance of the husk or flesh only of Terminalia chebula 36%, ammonium perchlorate 36%, nitrate of sodium 28%, be treated with 0.15% of agar-agar, the latter being employed to make a 2% mixture with water and 7.5% of the gelatine thus formed being used to treat the powdered mixture, this powder can be caused to form grains which will pass through a sieve of approximately 18 meshes to the square inch. If the strength of the agar-agar solution is slightly increased, the size of the grains will be increased so that they will only pass, for example, through a sieve having approximately 12 meshes to the square inch.

If the mixture of powders has been treated with oil or with oil and glycerine and with or without an admixture of red gum for the purpose of giving plasticity, the composition may be made up into cartridges of the required form and dimensions.

When an explosive composition as above described is to be ignited by fuse only, it may be desirable to help or ensure such ignition by adding to either of the above named compositions up to 9% of a powdered metallic substance such as aluminum powder or some substance such as wood meal or two of such substances may be combined. As an example 5% of aluminum powder may be employed.

What I claim as my invention and desire to secure by Letters Patent is:—

1. An explosive composition formed of a perchlorate oxygen carrier reasonably free from chlorates, and the dried and powdered husk or flesh, that is the outer part only and excluding the stone or kernel, of the fruit of Terminalia chebula.

2. An explosive composition formed of perchlorate of ammonium reasonably free from chlorates, and the dried and powdered husk or flesh, that is the outer part only and excluding the stone or kernel, of the fruit of Terminalia chebula.

3. An explosive composition formed of a perchlorate oxygen carrier reasonably free from chlorates, and the dried and powdered husk or flesh, that is the outer part only and excluding the stone or kernal, of the fruit of Terminalia chebula, with the addition of a small quantity of a substance which will cause the particles of powder to adhere.

4. An explosive composition formed of perchlorate of ammonium reasonably free from chlorates, and the dried and powdered husk or flesh, that is the outer part only and excluding the stone or kernel, of the fruit of Terminalia chebula, with the addition of a small quantity of a substance which will cause the particles of powder to adhere.

5. An explosive composition formed of a perchlorate oxygen carrier reasonably free from chlorates, nitrate of sodium, and the dried and powered husk or flesh, that is the outer part only and excluding the stone or kernal, of the fruit of Terminalia chebula.

6. An explosive composition formed of perchlorate of ammonium reasonably free from chlorates, nitrate of sodium, and the dried and powdered husk or flesh, that is the outer part only and excluding the stone or kernel, of the fruit of Terminalia chebula.

7. An explosive composition formed of a perchlorate oxygen carrier reasonably free from chlorates, and the dried and powdered husk or flesh, that is the outer part only and excluding the stone or kernel, of the fruit of Terminalia chebula, with the addition of such a small quantity of a vegetable oil as will cause the particles of powder to adhere.

8. An explosive composition formed of perchlorate of ammonium reasonably free from chlorates, and the dried and powdered husk or flesh, that is the outer part only and excluding the stone or kernel, of the fruit of Terminalia chebula, with the addition of such a small quantity of a vegetable oil as will cause the particles of powder to adhere.

9. An explosive composition formed of a perchlorate oxygen carrier reasonably free from chlorates, and the dried and powdered husk or flesh, that is the outer part only and excluding the stone or kernel, of the fruit of Terminalia chebula, with the addition of such small quantities of a vegetable oil and a gum as will cause the particles of powder to adhere.

10. An explosive composition formed of perchlorate of ammonium reasonably free from chlorates, and the dried and powdered husk or flesh, that is the outer part only and excluding the stone or kernel, of the fruit of Terminalia chebula, with the addition of such small quantities of a vegetable oil and a gum as will cause the particles of powder to adhere.

11. An explosive composition formed of a perchlorate oxygen carrier reasonably free from chlorates, and the dried and powdered husk or flesh, that is the outer part only and excluding the stone or kernel, of the fruit of Terminalia chebula, with the addition of a small quantity of glycerine for the purpose of obtaining plasticity and such a small quantity of vegetable oil as will cause the particles of powder to adhere.

12. An explosive composition formed of perchlorate of ammonium reasonably free from chlorates, and the dried and powdered husk or flesh, that is the outer part only and excluding the stone or kernel, of the fruit of Terminalia chebula, with the addition of a small quantity of glycerine for the purpose of obtaining plasticity and such a small quantity of vegetable oil as will cause the particles of powder to adhere.

13. An explosive composition formed of from 36% to 86% of a perchlorate oxygen carrier reasonably free from chlorates and from 9% to 36% of the dried and powdered husk or flesh, that is the outer part only and excluding the stone or kernel, of the fruit of Terminalia chebula.

14. An explosive composition formed of from 36% to 86% of perchlorate of ammonium reasonably free from chlorates and from 9% to 36% of the dried and powdered husk or flesh, that is the outer part only and excluding the stone or kernel, of the fruit of Terminalia chebula.

15. An explosive composition formed of a perchlorate oxygen carrier reasonably free from chlorates, from 25% to 35% of nitrate of sodium, and the dried and powdered husk or flesh, that is the outer part only and excluding the stone or kernel, of the fruit of Terminalia chebula.

16. An explosive composition formed of perchlorate of ammonium reasonably free from chlorates, from 25% to 35% of nitrate of sodium and from 9% to 36% of the dried and powdered husk or flesh, that is the outer part only and excluding the stone or kernel, of the fruit of Terminalia chebula.

17. An explosive composition formed of perchlorate of ammonium reasonably free from chlorates, and the dried and powdered husk or flesh, that is the outer part only and excluding the stone or kernel, of the fruit of Terminalia chebula, with the addition of not more than 7½% of a substance which will cause the particles of powder to adhere.

18. An explosive composition formed of perchlorate of ammonium reasonably free from chlorates, and the dried and powdered husk or flesh, that is the outer part only and excluding the stone or kernel, of the fruit of Terminalia chebula, with the addition of from 2% to 7% of a vegetable oil and from 2% to 7% of a gum.

19. An explosive composition formed of a perchlorate oxygen carrier reasonably free from chlorates, the dried and powdered husk or flesh, that is the outer part only and excluding the stone or kernel, of the fruit of Terminalia chebula, and a small quantity of a powdered metallic substance.

20. An explosive composition formed of perchlorate of ammonium reasonably free from chlorates, the dried and powdered husk or flesh, that is the outer part only and excluding the stone or kernel, of the fruit of Terminalia chebula, and a small quantity of a powdered metallic substance.

21. The process of mixing the ingredients and making up the herein described explosive composition according to which the dried husk or flesh that is the outer part only and excluding the stone or kernel of the fruit of Terminalia chebula without further drying is ground to a powder of sufficient fineness to pass through a sieve of from 50 to 70 mesh the resultant powder being placed in a mixing machine, the perchlorate oxygen carrier powdered to a fineness such as will enable it to pass through a sieve of from 90 to 110 mesh is then added gradually to the powdered husk while mixing is carried on.

22. The process of mixing the ingredients and making up the herein described explosive composition according to which the dried husk or flesh that is the outer part only and excluding the stone or kernel of the fruit of Terminalia chebula without further drying is ground to a powder of sufficient fineness to pass through a sieve of from 50 to 70 mesh the resultant powder being placed in a mixing machine, the perchlorate oxygen carrier powdered to a fineness such as will enable it to pass through a sieve of from 90 to 110 mesh being then added gradually to the powdered husk while mixing is carried on, finally sodium nitrate powdered so as to pass through a sieve of from 70 to 90 mesh is added gradually to the combined perchlorate and husk.

23. An explosive composition formed of approximately 64% of perchlorate of ammonium and 36% of the dried and powdered husk or flesh, that is the outer part only and excluding the stone or kernel, of the fruit of Terminalia chebula.

24. An explosive composition formed of approximately 42.5% of perchlorate of ammonium, approximately 31% of nitrate of sodium and 26.5% of the dried and powdered husk or flesh, that is the outer part only and excluding the stone or kernel, of the fruit of Terminalia chebula.

25. An explosive composition formed of approximately 36% of perchlorate of ammonium, approximately 28% of nitrate of sodium, approximately 29% of the dried and powdered husk or flesh, that is the outer part only and excluding the stone or kernel, of the fruit of Terminalia chebula, 5% of a non-drying vegetable oil, and 2% of a non-drying gum.

26. An explosive composition formed of perchlorate oxygen carrier substantially free from chlorate type of impurities, and chebulinic acid as contained in the flesh of Terminalia chebula dried in the absence of the kernel thereof.

27. An explosive compositon formed of perchlorate substantially free from chlorate type of impurity, and chebulinic acid contained in the powdered flesh of Terminalia chebula excluding the kernel.

In testimony whereof I have signed my name to this specification.

CAESAR GUSTAV LUIS.